April 24, 1934.  J. ROBINSON  1,956,047
AUTOMATIC TRAIN PIPE CONNECTER
Original Filed March 15, 1930    2 Sheets-Sheet 1
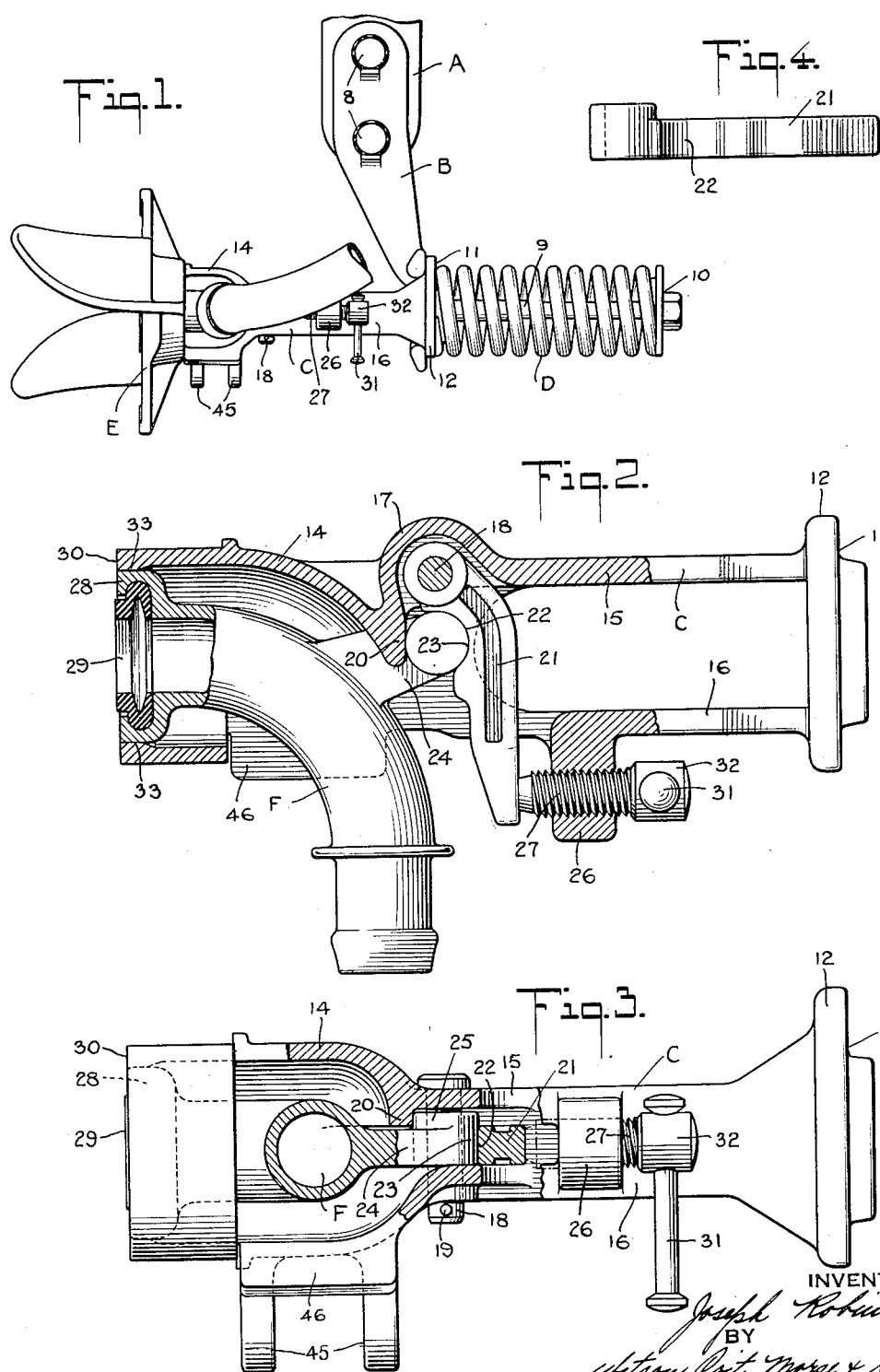

April 24, 1934. J. ROBINSON 1,956,047
AUTOMATIC TRAIN PIPE CONNECTER
Original Filed March 15, 1930 2 Sheets-Sheet 2
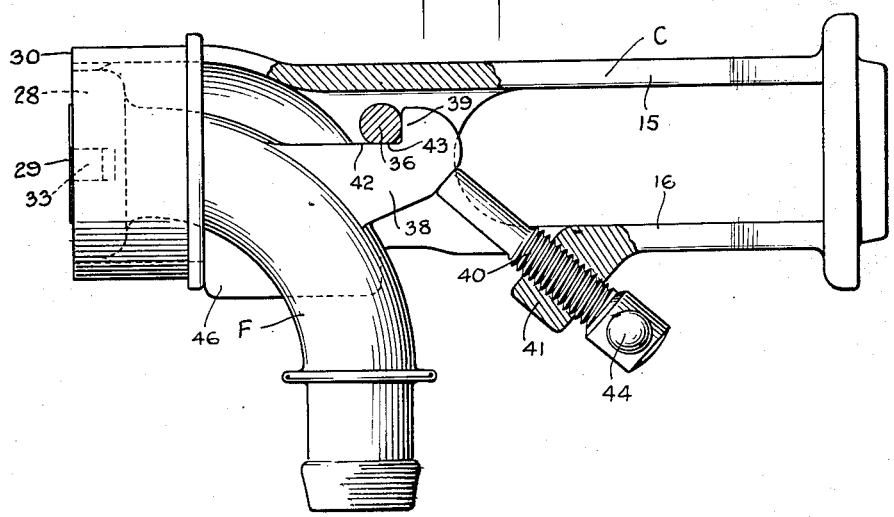
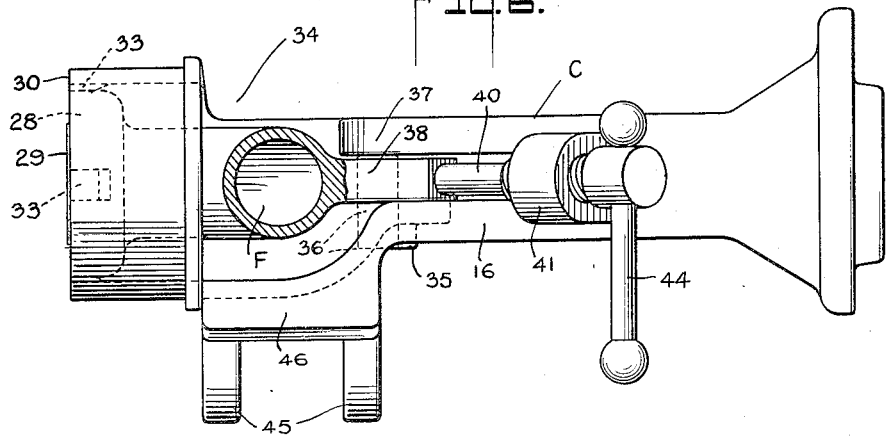
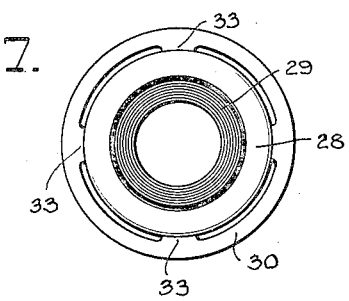
INVENTOR
Joseph Robinson,
BY
Watson, Coit, Morse & Grindle
ATTORNEYS Patented Apr. 24, 1934

1,956,047

UNITED STATES PATENT OFFICE 1,956,047

AUTOMATIC TRAIN PIPE CONNECTER

Joseph Robinson, New York, N. Y., assignor of one-half to Roy M. Wolvin, Montreal, Quebec, Canada Application March 15, 1930, Serial No. 436,118
Renewed July 22, 1932

6 Claims. (Cl. 285—58)

My invention relates to automatic train pipe connecters and particularly to devices for replacing a defective gasket between the faces of mated connecter heads without parting the heads. Among the objects is to provide means for gradually moving the gasket away from its coupled position so that if, as is frequently the case, there is considerable air pressure in the connecter hose when the gasket needs to be renewed such pressure can be gradually released and the gasket removed with safety. In the construction shown in my patent dated April 15th, 1919, #1,300,652, it is quite difficult to extract the retaining pin 21 of the patent while the gasket is under air pressure, the reason being that the air pressure forces the conduit 13 rearwardly against the pin 21. In my present invention the conduit which supports the gasket is gradually shifted longitudinally in the head into and out of the service position by a simple powerful locking clamp. Another object of my invention is to so mount the gasket carrying conduit in the head or head supporting member as to minimize the fouling effect thereon of rust and corrosion.

In the accompanying drawings Figure 1 is a side elevation of an automatic connecter provided with my improvement;

Figure 2 is a sectional plan view of the yoke or head supporting member;

Figure 3 is a sectional elevation of the construction shown in Figure 2;

Figure 4 is a front elevation of the trigger or jaw 21;

Figure 5 is a sectional plan view of a modification of my improvement;

Figure 6 is a side elevation of the construction shown in Figure 5. In this view a part of the conduit is cut away, and Figure 7 is an end view of the head supporting member or yoke, and the gasket carrying conduit.

My improvement may of course be used with any suitable type of automatic connecter. I illustrate it as it is used on a connecter that has been extensively in service wherein this invention has been developed. A suitable lug A is cast integral with or otherwise secured to the car coupler (not shown) and the connecter bracket B is rigidly anchored thereto as by bolts or rivets 8. The bracket extends downwardly from the lug and is spanned by the hollow body or head supporting yoke C. That portion of the bracket which occupies the opening in the member C is embraced by a tie rod 9 which has universal movement upon the lower portion of the bracket. A buffer spring D of suitable construction surrounds the tie rod and is supported at one end by the adjustable abutment 10 and at the other end on the seat 11 of the yoke C. In this manner the flange or projection 12 of the yoke is yieldingly held against the rear face of the bracket, as shown in Figure 1, thus flexibly supporting the member C and the coupling head E for universal movement from the normal uncoupled position shown in Figure 1.

The yoke C comprises a hollow forward end 14 which suitably receives the coupling head E as by pressing the head thereon, forming the head integral therewith, or otherwise securing it thereto. The opening through this hollow portion of the yoke diverges laterally out one side of the yoke as shown particularly in Figure 2. Straps 15 and 16 horizontally spaced apart connect the flange 12 with the hollow forward end of the yoke, all these parts being preferably formed integral one with the other though they may be otherwise connected if desired. At the juncture between the hollow end 14 and the strap 15 I provide a housing 17 downwardly through which I pass a pivot pin 18 suitably locked in place as by a cotter 19. If preferred a rivet may be substituted for the pin 18. The forward wall of the housing extends transversely of the yoke and forms an abutment or stop 20. The pin or rivet 18 passes through one end of the trigger or jaw 21 which lies in the housing 17 and pivots upon the pin 18 at one end and on one side of the longitudinal axis of the yoke. The other end of the jaw 21 extends to the opposite side of said axis and preferably at approximately a right angle thereto and outside of the yoke C. This pivoted anchor device or jaw 21 is provided near its bearing on the pin 18 with a recess or seat 22 which quite snugly receives the complementarily shaped rear face or portion 23 of a lug 24 on the rear side of the fitting or gasket carrying conduit F. The lug is provided with a vertically extending shoulder or abutment 25 adapted to bear against the stop or abutment 20 of the yoke. Extending laterally away from one side of the strap 16 of the yoke I provide a lug 26 which threadingly receives the plunger or clamping screw 27, such screw being suitably secured against accidental removal from the lug. As the screw is threaded inwardly or outwardly with respect to the lug 26 the clamp or jaw formed by the trigger 21 and the abutment 20 is opened or closed and the conduit F accordingly locked or released from the service position shown in Figure 2. The parts of my invention are of course so proportioned and arranged as to support the enlarged recessed front end 28 of the conduit, and the air expanded gasket 29 therein, in substantially the plane of the front face 30 of the yoke C when the shoulder 25 of the lug 24 rests against the stop 20. By rotating the nut or screw 27 rearwardly the trigger or jaw 21 gradually releases the conduit F from the service position, permitting the gasket 29 to be removed and replaced while the coupling heads E remain coupled. A sliding or adjustable handle 31 is anchored in the enlarged perforated head 32 of the screw 27 and serves not only as means by which to rotate the screw but, through contact with the side 16 of the yoke C, locks the screw in place.

The enlarged forward or gasket carrying end of the conduit F rests between four relatively narrow bearings 33 (Figures 2, 6 and 7) arranged at the front end of the yoke C. This arrangement reduces the contacting surfaces between the yoke and the front end of the conduit and hence minimizes the likelihood of fouling from rust or corrosion. It will be noted in Figures 2, 5 and 6 that the rear portions of these surfaces 33 taper into the main walls of the front end of the yoke, which arrangement facilitates insertion of the conduit F.

The modification of my improvement shown in Figures 5 and 6 consists in cutting away the upper part of the hollow forward end of the yoke C as indicated at 34, and passing upwardly through a bearing 35 on the underside of the yoke, an abutment or stop pin 36. This pin is preferably of steel and pressed into its bearing 35 and against the underside of the overhanging lug or wall 37 of the yoke. The rear portion of the lug 38 is offset to form a dog or hook 39 which abuts the rear side of the pin 36. A plunger or screw 40 similar to the one shown in Figures 2 and 3 is threadingly mounted in a lug 41 formed on one side of the strap 16 of the yoke C and extends into engagement with the lug or dog 38. This screw or clamp is suitably anchored against accidental extraction from the lug 41, and by adjusting it in the lug the dog 38 is forced into locked engagement with the pin 36 or released therefrom as desired. It will be understood that as the plunger 40 engages the dog the conduit F is shifted forwardly with the inner surface 42 of the lug 38 contacting with a flat portion 43 on the pin 36 until the conduit is in the position shown in Figure 5, and that the reverse of this operation will release the conduit F from the service position. A sliding or adjustable handle 44 passes through the rear end of the plunger 40 and serves to rotate the plunger and by contact with the wall or strap 16 of the yoke C, serves also to prevent accidental rotation of the plunger.

It will be obvious that with either of the constructions described the conduit F may be gradually adjusted into and out of the service positions. Thus if it is desired to remove a defective gasket while there is still fluid pressure in the conduit the same may be safely done inasmuch as the air will quickly leak out as the conduit is gradually moved from the service position.

The downwardly extending lugs 45, formed integrally with the underside of the yoke C, together with the laterally projecting lip or abutment 46, serve as carriers or supports for an interchange device such as shown in my co-pending application Serial #387,762 filed August 22nd, 1929.

What I claim is:

1. An automatic train pipe connecter comprising in combination, a coupling head and supporting means therefor, said means including a hollow shank secured to said head, said shank having an abutment, a member pivoted adjacent said abutment, a conduit mounted in said shank and having a lug engaging said member and said abutment, and adjustable means for rocking said member relative to said shank to force said lug into firm engagement against said abutment and for gradually releasing the lug from such engagement to permit removal of said conduit.

2. An automatic train pipe connecter comprising in combination, a coupling head and supporting bracket therefor, a member extending rearwardly away from said head into supporting relation to said bracket, said member having a hollow forward end and having a longitudinally extending wall or portion, a lug extending laterally away from said wall, an anchor device pivotally mounted on said member and having a portion which extends transversely of said member and lies in front of said lug, a stop, a conduit removably mounted in the hollow forward end of said member and provided with a projection adapted to engage said anchor device and said stop, and means on said lug for gradually moving said anchor device to shift said projection into engagement with said stop whereby said conduit is firmly locked in said member.

3. An automatic train pipe connecter comprising in combination, a coupling head and a supporting bracket therefor, a member connecting said head and bracket, said member being provided with an open forward end and secured to said head, a conduit extending into said forward end, and means for removably locking the conduit in place, said means including a stop for limiting the forward movement of the conduit, a lug on one side of said member, and a device threaded through said lug for shifting the conduit into locked position against said stop.

4. An automatic train pipe connecter comprising in combination, an apertured coupling head, a support therefor, a conduit mounted in said aperture, means to prevent fouling of the conduit in the aperture due to corrosion, and means for removably maintaining the conduit therein, said maintaining means including a clamping screw carried by said support and rotatable to engage a part of said conduit to anchor the conduit in place and means for preventing undesired rotation of said screw.

5. In a construction of the kind described, in combination, a head supporting member having a recess therein, a conduit mounted in said recess, said conduit having a part adapted to engage a part of said head supporting member, an arm pivotally mounted on said head supporting member and movable into engagement with said part of the conduit and a plunger threadedly mounted on said supporting member and rotatable into engagement with said arm.

6. In a construction of the kind described, in combination, a connecter head having a hollow shank extending rearwardly therefrom, a conduit removably mounted in said shank, said shank having a lug thereon, said conduit having a projection on the rear side thereof adapted to engage said lug, and means mounted on said shank and movable into engagement with said projection to lock the same against said lug.

JOSEPH ROBINSON.